United States Patent [19]

Small

[11] 3,727,947
[45] Apr. 17, 1973

[54] HYDRAULIC VALVE FOR VEHICLE LEVELING

[75] Inventor: Ralph E. Small, Mount Clemens, Mich.

[73] Assignee: General Motors Corporation, Detroit, Mich.

[22] Filed: Nov. 5, 1971

[21] Appl. No.: 195,950

[52] U.S. Cl. .............................. 280/124 F, 137/596
[51] Int. Cl. ................................................ B60p 1/16
[58] Field of Search ................... 280/124 F, 6 R, 6 H, 280/DIG. 1; 267/65 D; 137/596, 596.1, 596.12

[56] References Cited

UNITED STATES PATENTS

| | | | |
|---|---|---|---|
| 3,071,394 | 1/1963 | Miller | 280/124 F |
| 3,559,688 | 2/1971 | Fischer | 267/65 D |
| 2,955,843 | 10/1960 | Chuba | 280/DIG. 1 |
| 3,599,954 | 8/1971 | Yew | 280/124 F |

*Primary Examiner*—Philip Goodman
*Assistant Examiner*—John Carroll
*Attorney*—W. S. Pettigrew et al.

[57] ABSTRACT

A three position height control valve having a damping piston, a valve operator and valving components for controlling flow of fluid between a high pressure source, a low pressure source and a leveler unit. The valve piston orifices are varied by adjustable temperature responsive control rods to maintain a uniform damping action. Check valves allow flow of make-up fluid from one end of the piston to the opposite end thereof. They are carried by a tray on the end of the piston and movable apart therefrom to permit a quick return of the damping piston to a centered position.

4 Claims, 6 Drawing Figures

INVENTOR.
Ralph E. Small
BY
J.C. Evans
ATTORNEY

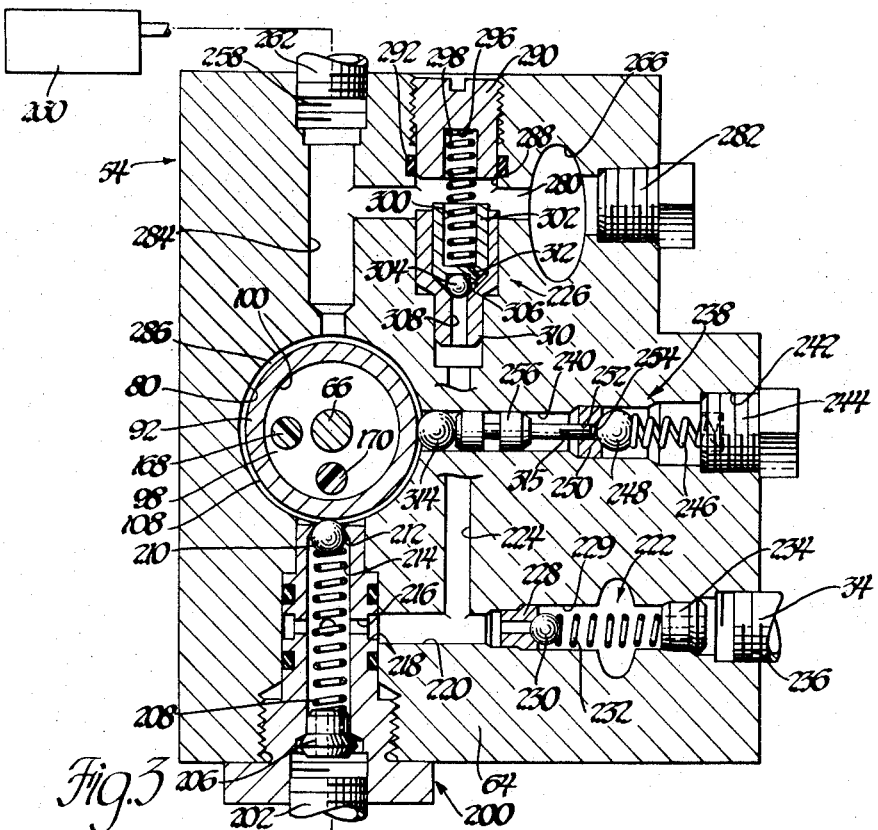
Fig.3
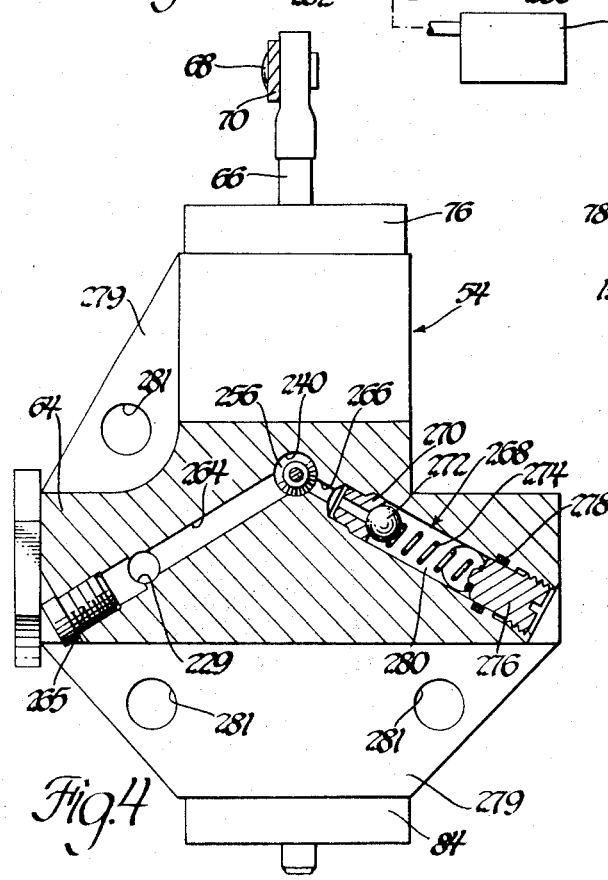
Fig.4
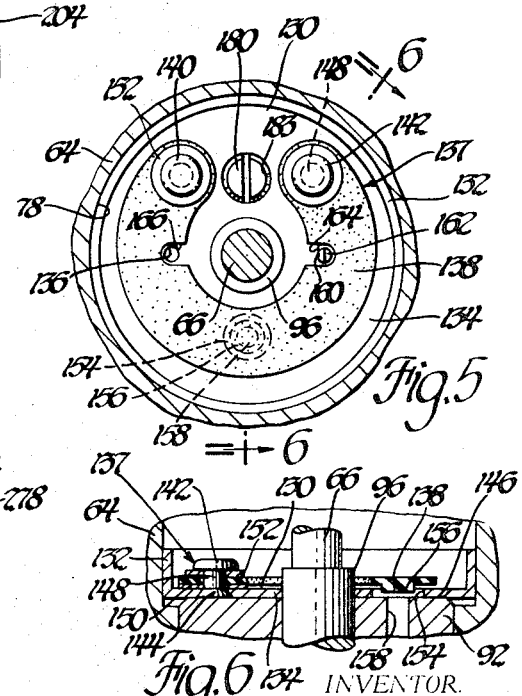
Fig.5
Fig.6
INVENTOR.
Ralph E. Small
BY
J.C. Evans
ATTORNEY

HYDRAULIC VALVE FOR VEHICLE LEVELING

This invention relates to valves for controlling vehicle leveling and more particular to three position height control valves for maintaining control of fluid from a high pressure source to a leveler unit during a fill phase of operation and for control of fluid from the leveler unit back to a low pressure source during an exhaust phase of operation and wherein the valve includes a damper piston to prevent valve operation in response to normal vehicle road movements.

Vehicle leveling systems have a leveler unit with one portion thereof connected to the sprung mass of the vehicle and a second portion thereof connected to an unsprung portion of a vehicle. A variable volume chamber is formed between the first and second portions of the leveler unit and is adapted to be connected to a source of pressure from whence fluid is directed into the variable volume chamber for displacing the first and second portions of the unit apart from one another in order to maintain a predetermined height relationship between the sprung and unsprung portions of a vehicle.

In such systems the control of fluid to and from the variable volume chamber of the leveler unit is dependent upon the control of a valve mechanism which will respond to changes in the load of the vehicle which cause the sprung and unsprung portions of the vehicle to move above or below a predetermined height relationship.

One class of controllers are characterized as three position hydraulic valves which include first valve means that are positioned when the vehicle is loaded to direct high pressure fluid into the variable volume chamber of a hydraulic leveler unit; second valve means positioned when the vehicle is unloaded to direct pressurized fluid from the leveler unit back to the low pressure source; and valves positioned when the vehicle is at a desired height relationship to disconnect both the high and low pressure sources of fluid from the leveler unit.

In such arrangements a hydraulic dashpot or damper mechanism is often included to prevent operation of the valve in response to high frequency, low amplitude movements of the vehicle.

In such arrangements only a sustained load change will cause the valve to assume either its fill or exhaust positions of operation. The damper usually includes an oil filled cylinder in which is located a damper piston that is slidably reciprocated in response to movements of the sprung and unsprung masses of the vehicle to operate valving components only when there is a sustained load change on the vehicle. In such arrangements, the viscosity of the oil within the cylinder is subject to change which can result in a change in response to the high frequency road movements. For example, if the ambient conditions of the leveling system are elevated, the viscosity of the oil can be changed to a point where the valve damper action is less than desired.

Another consideration in the operation of such three position valves is that following either a fill or exhaust phase of operation it is desirable to quickly return the valving components to a neutral or level position and to do so by means that will quickly position the damper piston in a neutral or level position to prevent either over-leveling or under-leveling of the sprung mass with respect to the unsprung mass.

Accordingly, one object of the present invention is to provide an improved three position height control valve having an oil-filled damper cylinder with a reciprocating piston therein which prevents ordinary vehicle road movements from operating the valve and wherein a pair of elongated adjustable control rods are provided which contract and expand in accordance with changes in the temperature of the damping fluid within the cylinder to change the flow area through damping orifices in the piston thereby to maintain valve control through a range of temperature conditions.

Still another object of the present invention is to improve three position height control valves for vehicle leveling systems by the provision of an oil-filled damping chamber having a reciprocating piston therein with flap valves on either end thereof which permit flow of oil to each end of the piston to prevent the piston from hanging up in the damping cylinder and wherein a tray carries the flap valve through a predetermined amount of piston travel in a given direction and thereafter separates the flap valve from the piston to provide free flow of oil between the flap valve and the piston end as it moves from a fill or exhaust position back to a centered or neutral position thereby to permit a quick return of the damping piston from its operative position to a neutral or centered positions within the valve mechanism.

These and other objects of the present invention are provided in a valve mechanism which includes a housing attached to one portion of a vehicle, for example its body frame, and a lever end connected to another portion of the vehicle, for example, to a link that is operatively connected to the axle housing of the vehicle.

The valve includes an oil-filled damper cylinder in which is located a main damping piston having one end thereof connected to the valve lever. When the vehicle is loaded the body frame will settle and cause the lever to push the main piston into the oil cylinder against a centering spring. The movement is damped by oil flow from one end of the main piston to its opposite end through a control orifice.

When the body is settled below a predetermined height relationship, a relief groove on the main piston is directed into alignment with a ball engaging one end of a plunger which is spring biased to close a bypass check valve between an inlet port adapted to be connected to a high pressure source of fluid and an outlet port adapted to be connected to a low pressure source of fluid.

High pressure oil is then directed through a control port to a leveler unit so that high pressure fluid will pass into a variable volume chamber of a leveler unit causing the leveler unit to extend to compensate for an additional load on the vehicle. This in turn causes the vehicle body to rise back to a desired height relationship.

The main piston includes two adjustable control rods each having one end connected to one end of the piston and an opposite end with a slight conical configuration centered in front of a large orifice opening through the opposite piston end. The rods contract and expand with temperature changes in the oil which fills the damping cylinder. The rods are made from a material having a coefficient of thermal expansion which is approximately five times that of the piston material and serve to correct for varying damping which is due to viscosity changes in the oil as it changes its temperature in accordance with ambient conditions of the leveling system.

The valve includes counterbores on each end of the piston cylinder in which are located spring biased valving mechanisms including a tray which is slidably supported within each of the counterbores and a flap valve mounted on the tray to permit unidirectional flow through an unrestricted piston opening.

When the main piston moves in one direction within the damping cylinder, it lifts one of the flap valve trays upwardly against the force of a return spring and it moves outwardly of the counterbore at its opposite end. When it leaves the opposite end counterbore, the flap valve tray on the opposite end is retained within the opposite end counterbore and it is separated from the end of the piston which is moving away. Movement of the damper piston is controlled by oil flow through the damping orifice in an opposite piston end in accordance with the relationship between it and the temperature responsive control rod associated therewith.

Following a control of movement, the return springs will act on valve trays to press against the piston to move it in the opposite direction. Such movement is undamped until the piston engages the separated tray, at which point the tray and the flap valve thereon will restrict oil flow from the opposite counterbore.

The arrangement of flap valve trays located in counterbores are separable from piston ends. This permits the damping piston to quickly return from a fill or exhaust position to a neutral or centered level position following a corrective phase of operation. This prevents valving components in the device from being slow to respond to an actual correction of the height relationship in the vehicle and accordingly, the vehicle is maintained at the predetermined height relationship without overshoot above or below the height relationship once it has been leveled.

Further objects and advantages of the present invention will be best understood by reference to the following description taken in conjunction with the accompanying drawings in which:

FIG. 3 is a horizontal sectional view taken along the lines 3—3 of FIG. 2 looking in the direction of the arrows;

FIG. 4 is a vertical sectional view taken along the lines 4—4 of FIG. 2 looking in the direction of the arrows;

FIG. 5 is a horizontal sectional view taken along the line 5—5 of FIG. 2 looking in the direction of the arrows; and FIG. 6 is a sectional view taken along the lines 6—6 of FIG. 5 looking in the direction of the arrows.

Figures 1, 2:
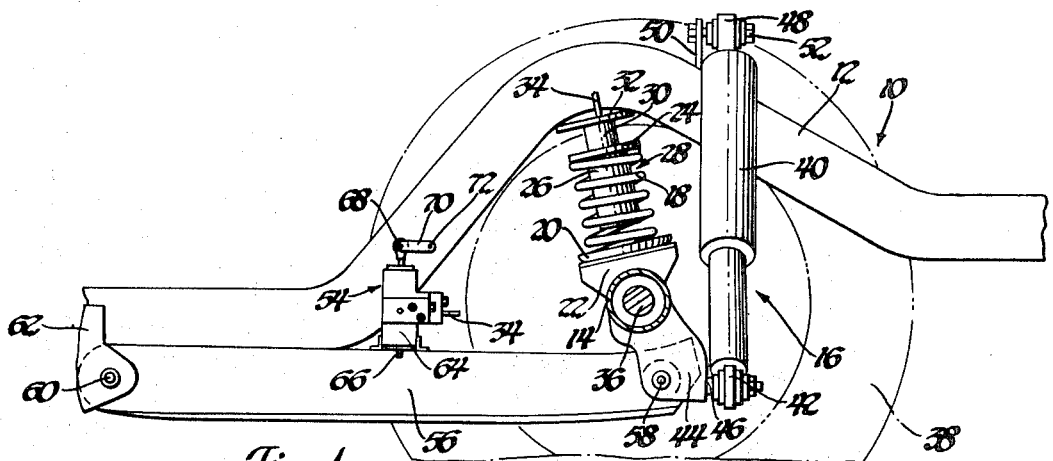
FIG. 1 is a fragmentary elevational view of a portion of a vehicle leveling system including the present invention.
FIG. 2 is a vertical sectional view of a three position height control valve including the features of the present invention.

In FIG. 1, a portion of a vehicle 10 is illustrated including a segment of a rear chassis frame 12 and a rear axle housing 14.

The axle housing is formed as part of a rear suspension 16 in which the frame 12 is resiliently supported for relative movement with respect to the axle housing 14.

More particularly, the rear suspension 16 includes a pair of springs at either end of axle housing 14. One of these springs is illustrated at 18 on one side of the axle housing 14. A like spring (not shown) is on the opposite side of the axle housing 14. Each of the springs has one end thereof supported against a spring seat 20 on a bracket 22 fixedly secured to the axle housing 14. The opposite end of the spring is seated against a flange 24 formed on a cylinder portion 26 of a vehicle leveler unit 28.

The cylinder portion 26 is located in telescoping relationship with a second portion 30 of leveler unit 28. This portion is fixedly secured by means of a bracket 32 to the frame portion 12.

The leveler 28 is of the type which is adapted to be connected by means of a fluid conduit 34 through which pressurized fluid is directed into and out of a variable volume pressurizable chamber formed between the leveler unit portions 26, 30.

A like leveler unit (not shown) is on the spring at the opposite end of the axle housing 14.

Additionally, the rear suspension 16 includes ground engaging wheel and tire assemblies at opposite ends of the axle housing 14 operatively connected to an axle 36. One of the ground engaging wheel and tire assemblies is shown at 38 in FIG. 1, it being understood that a like assembly is located at the opposite end of the axle housing 14 and axle 36.

The vehicle also includes a shock absorber 40 of the double, direct acting hydraulic type having one end mount 42 secured to a lower bracket 44 on the axle housing 14 by fastening means 46. An upper end mount 48 on the shock absorber is connected to a bracket 50 on the frame 12 by means of a fastening means 52.

The leveler units 28 are automatically controlled by an improved three position control valve assembly 54 which is constructed in accordance with principles of the present invention. More particularly, the three position height control valve 54 is connected to one portion of a vehicle, for example, to an axle housing stabilizing arm 56 which has one end thereof connected by a pin 58 to the bracket 44 and the other end thereof connected by means of a pin 60 to a bracket 62 connected to a forwardly located portion of the rear chassis frame 12.

Valve 54 includes a housing 64 with a valve operating rod 66 extending outwardly therefrom. Rod 66 is connected by a pin 68 to one end of a link 70 which has the opposite end thereof connected by a friction pin 72 to a second portion of a vehicle, for example, to a portion of the rear chassis frame 12.

Valve operation rod 66 extends through a bore 74 in an end cap 76 threadably received within one end of a counterbore 78 which is internally threaded at the upper end thereof and smooth surfaced at the lower end thereof. The counterbore 78 in turn is arranged coaxially of a housing bore 80 which is aligned with a second counterbore 82 at the opposite end of the housing 64. The counterbore 82 is in turn closed by a second valve end cap 84 which is threadably received therein.

The opposite end of rod 66 extends through a guide bore 86 in the end cap 84.

An O-ring seal 88 in the end cap 76 is in sealing engagement with the outer surface of the rod 66 as it passes through the cap 76 and an O-ring 90 in the end cap 84 likewise engages the other end of rod 66 to seal the outer periphery thereof as it extends outwardly of the opposite end of the housing.

A flow control valve piston 92 is slidably supported within the housing bore 80 and has a closed end 94 thereon secured to a large diameter portion 96 of the rod 66 whereby movement of the rod 66 into and out of the housing 64 as produced by relative movement between the frame 12 and the stabilizer arm 56 will cause the valve piston 92 to oppositely reciprocate within the bore 80.

In accordance with certain principles of the present invention, the valve includes a cross-flow chamber 98 therein defined in part by the piston end 94, internal surface 100 of the piston 92 and a flow control piston plug 102 which is seated on a shoulder 104 in the opposite end of the piston to close an end opening 106 therein.

The outer surface of the piston 92 includes a circumferential relief groove 108 at one end thereof which is separated from a second relief groove 110 by an intermediate land portion 112 formed circumferentially around the outer surface of the piston 92 to be slidably supported within the piston bore 80.

The cross-flow chamber 98 is communicated with the counterbore 78 through a relatively large diameter orifice 114 extending through the valve piston end 94.

The cross-flow chamber 98 is communicated with the counterbore 82 through a large diameter orifice 116 extending through the plug 102.

The bore 80 as well as the counterbores 78, 82 are filled with a suitable viscous damping fluid which flows between the counterbores 78, 82 and the cross-flow chamber 98 under the control of the orifices 114, 116 to damp movement of the rod 66 with respect to the valve housing 64. The viscous fluid is sealed within the valve housing 64 in part by an O-ring gasket 118 in the housing 64 around the counterbore 78 therein where it is located to sealingly engage an undercut surface 120 on the end cap 76. At the other end of the housing, a like O-ring gasket 122 is located in the housing 64 around the counterbore 82 therein where it is located to sealingly engage an undercut surface 124 on the end cap 84.

The piston 92 is normally centered within the bore 80 by means of a pair of piston check valve springs 126, 127. The spring 126 is located within the counterbore 78 and includes a small diameter loop on one end thereof centered on an inwardly extending raised surface 128 formed on the inner end of the end cap 76. The opposite end of the spring 126 has a large diameter loop thereon seated against a check valve tray member 130. Member 130 has a raised peripheral wall 132 thereon slidably received by the counterbore 78 and a base portion 134 thereon seatable against the end 94 of the piston 92. The base portion 134 has an opening 136 formed therein which is aligned with the orifice 114.

As best shown in FIG. 5, the tray member 130 encloses a check valve assembly 137 having a flap valve check member 138 having a semi-circular like configuration with one end of the member 138 being fixedly secured to the tray 130 by means of a rivet 140 and the opposite end of the member 138 being secured thereto by means of a rivet 142.

Each of the rivets 140, 142 have a head portion 144, as is best seen in FIG. 6, that is located inside the end surface of the base portion 134 so that the base portion 134 is normally maintained seated against the end face 146 of the piston 92. Each of the rivets has a shank portion 148 thereon sealed by means of a lower washer 150 held between the secured portion of the flap valve 138 and the base portion 134 of the tray and an upper washer member 152 sealingly secured between the rivet and the upper face of the flap valve 138.

The rivets 140, 142 are thereby sealed against oil flow between opposite ends thereof. Oil flow through the flap valve 138 is unidirectional and through a check valve opening 154 in the base portion 134.

The flap valve 138 has a boss 156 formed thereon which is centered within the check valve opening 154 whereby movement of the piston 92 interiorly of the counterbore 78 will cause the flap valve 138 to be pressed against the tray base portion 134 with the boss portion 156 thereby being pushed downwardly in the opening 154 so that the flap valve 138 will close the opening 154 against oil flow from the counterbore 78 thence through the valve opening 154 which is aligned with a flow passageway 158 that is formed in the piston end 94 between the counterbore 78 and the cross-flow chamber 98.

The passageway 158 is less restricted than the orifice opening 114 and serves to bypass the orifice opening 114 when the piston 94 moves outwardly of the counterbore 78.

Additionally, the valve assembly 137 includes a dowel member 160 which has one end thereof seated in the piston end 94 and the opposite end thereof extending upwardly within the counterbore 78.

It includes a chamfer 162 at one end thereof which faces the outer diameter of the piston. The flap valve 138 has a guide surface 164 formed on one side thereof which fits around the dowel 160 so as to center the flap valve 138 in place on tray 130. Dowel 160 also guides the assembly 137 when it is separated from piston 92.

The opposite side of the flap valve is cut out at 166 to permit free flow from the opening 136 in the base portion 134 to the counterbore 78.

As best seen in FIG. 5, the rod 66 is located centrally of the inside surface of a flap valve 138 at a point radially inwardly thereof whereby the flap valve 138 is free to move relative thereto.

Another feature of the present invention is the provision of a pair of adjustable orifice control rods 168, 170 located within the cross-flow chamber 98.

More particularly, the adjustable rod 168 has a base portion 171 thereon fixedly secured to an orifice adjusting screw 172 which is threadably adjusted within a tapped opening 174 through the piston plug 102 to cause the rod 168 to be axially positioned within the cross-flow chamber 98. More particularly, the axial adjustment of the rod 168 will position a slight conical point 176 thereon with respect to the inside end of the orifice opening 114 to regulate the control flow of viscous fluid therethrough. The control rod 168 is preferably made from tetrafluoroethylene which has a coefficient of expansion approximately five times that of the piston 92, preferably a steel member. Because of this difference in coefficient of expansion the rod 168 will expand axially from an adjusted position within the plug 102 in accordance with the temperature of the damping fluid in the valve assembly. Thus, under conditions where the viscous fluid temperature increases, the rod 168 will expand to move the slightly conical point 176 closer to the end of the orifice opening 114. Since the viscosity of the damping fluid decreases in response to an increase in temperature thereof, the expansion of the rod 168 produces an automatic compensation for temperature changes in the damping fluid to maintain a relatively constant damping force acting on the piston 92 as it is reciprocated within the bore 80 when the rod 66 moves into and out of the housing 64 in response to relative movement between the frame 12 and the stabilizer arm 56 as normally occurs in vehicle operation.

The adjustable control rod 170 is located in a 90° relationship with respect to the rod 168 as is best shown in FIG. 3. It includes a base portion 178 thereon which is secured within an orifice adjusting screw 180 threadably received within a tapped opening 182 in the piston end 94. Opening 183 in tray 130 gives access to screw 180. The rod 170 has a slight conical point 184 thereon located in alignment with the orifice opening 116 to produce control of viscous fluid flow therethrough in the same manner as does the rod 168.

The opening 116 extends to a check valve assembly 186 located within the counterbore 82. Check valve assembly 186 has the same configuration as does the previously described valve assembly 137. More particularly, it includes a valve tray 188 which corresponds to the valve tray 130. A small diameter loop on the check valve spring 127 is centered about a shoulder 190 formed on the inside surface of the end cap 84. The opposite end of the spring 127 is supported by the tray 188 at a point located radially outwardly of a flap valve 192 which has the same semi-circular configuration as flap valve 138.

In this embodiment, the tray 188 includes an access opening 194 to adjusting screw 172. It also includes a valve opening 195. Additionally, it includes a positioning dowel (not shown) like that shown at 160 in valve assembly 137. The flap valve 192 is of a semi-circular like configuration with the spaced ends thereon secured in place by sealed rivets having a configuration identical to like parts in valve assembly 137. A relief opening or flow passageway 196 like opening 158 extends through the plug 102. It is under the control of a boss 198 on the flap valve 192 which is centered above and adapted to move into valve opening 195.

Thus, when the valve piston 92 is centered by the springs 126, 128, each of the valve assemblies 137, 186 is seated against the respective ends of the pistons to close the flow passageways 158, 196.

The piston 92 along with the valve assemblies 137, 186 cooperate to damp movement of the rod 66 and accordingly delay opening and closing of valving components of the valve 54 against ordinary road movements to only allow operation of valves during a fill and exhaust phase of operation wherein the leveler units are filled or exhausted with fluid to maintain a predetermined height relationship in the vehicle.

The valve controller includes an inlet adapter 200 which is connected by means of a supply conduit 202 to a high pressure source 204. The adapter 200 includes a hollow spring retainer 206 which receives one end of an unloading valve spring 208 which has the opposite end thereof held against an unloading valve 210 that is supported on the outer periphery of the valve piston 92 as is best seen in FIG. 3.

The unloading valve ball 210 is thereby maintained in sealing engagement with a valve seat 212 formed on the inside end of the adapter 200. The interior 214 of the adapter 200 communicates with a plurality of radially outwardly directed openings 216 which in turn communicate with a circumferential groove 218 in the adapter 200. Groove 218 communicates with a high pressure passageway 220 in housing 64. The high pressure passageway 220 leads to a leveling check valve assembly 222 and also to a relief valve passageway 224 communicating with a high pressure relief valve assembly 226.

The leveling check valve assembly 222 includes a check valve seat 228 in bore 229. Seat 228 has an opening therethrough and a valve seat on one end thereof closed by a ball valve element 230 held in place by means of a spring element 232 having the opposite end thereof carried by a spring retainer member 234 which is hollow to communicate the high pressure passageway 220 and bore 229 with a leveler unit outlet opening 236 when the ball 230 is spaced from the seat on the check valve seat element 228.

The valve controller further includes a bypass check valve assembly 238 which is located within a bore 240 in the housing 64 which is transverse to and which intersects the bore 80 as illustrated in FIG. 3.

The bore 240 increases in diameter toward the outside of the housing 64 where it defines a valve access port 242 closed by a threaded plug 244. The threaded plug 244 receives one end of a valve spring 246 which seats against a bypass check ball 248 in turn seated against a valve seat element 250. The valve seat element 250 has a passageway 252 therethrough in which is located the tip 254 of a plunger 256 which reciprocates within the bore 240 to lift the ball element 248 from the seat 250 to complete a bypass from the high pressure adapter 200 to a low pressure port 258. Port 258 is connected to a low pressure source 260 such as the sump of a hydraulic pumping system by means of an exhaust conduit 262.

The bypass between the inlet adapter 200 to the exhaust or low pressure port 258 extends from the adapter 200 thence through the high pressure passageway 220 and across the leveling check valve assembly 232. It is intersected by an upwardly inclined passageway 264 as shown in FIG. 4, that intersects the bore 240. A plug 265 closes passageway 264. A downwardly inclined passageway 266 as seen in FIG. 4 also intersects the bore 240. It includes a low pressure check valve assembly 268 including a seat element 270 seated in a bore or passageway 266. In a large diameter portion of the bore 266 is located a ball element 272 held in sealing engagement with the seat 270 by means of a valve spring 274. It has the opposite end thereof held in place by a low pressure adjusting screw 276 which is threadably received in a tapped end of bore 266. The screw 276 is sealed by means of an O-ring 278 in the housing 64. FIG. 4 also shows gusset plates 279 on housing 64 with bolt holes 281 for securing the valve in place on part of a vehicle.

Fluid from the bore 266 passes through a passageway 280 transverse thereto. The passageway 280 is closed at one end by a plug 282 threadably received within a tapped opening in the housing 64. The opposite end thereof intersects an unloading passageway 284 which is connected between the low pressure port 258 and a circumferential opening 286 formed between the housing 64 and the outer surface of the piston 92.

The passageway 280 also intersects a bore 288 which is tapped at one end to threadably receive a high pressure adjusting screw 290. An O-ring gasket 292 seals the inner end of the screw 290. The inner end is recessed at 296 to receive one end of a high pressure relief valve spring 298 having the opposite end thereof seated within the central opening 300 of a damper valve 302.

The damper valve carries a ball element 304 in a hollow nose portion thereon. When the relief valve 226 is closed, the ball 304 is held in sealing engagement with an inclined annular seat 306 formed around an inlet opening 308 in an insert 310 of the relief valve assembly 226.

The damper valve 302 includes a small diameter orifice 312 extending through the nose thereof to communicate the passageway 308 with the low pressure passageway 280 when the relief valve is opened in response to a high pressure condition within the leveling system.

The operation of the device includes a level or centered phase of operation wherein the piston 92 is maintained centered within the bore 80 as shown in FIG. 2. Under this condition, a spherical ball configured follower element 314 is located on an inclined ramp leading from the relief groove 108 up to the land 112. At this point the tip 254 of the plunger 256 will press against the ball 248 to move it outwardly of the seat 250. The plunger is grooved at 315. Hence, a bypass is defined from the high pressure passageway 220 through the leveling check valve seat assembly upwardly through the inclined passageway 264 and across the seat passageway 252 thence to the bore 240 in the downwardly inclined passageway 266 to be directed across the low pressure check valve assembly 268.

The high pressure flow thence passes through the low pressure passageway 280 to the outlet or low pressure port 258 from whence the fluid will flow back to the low side of the system.

During this phase, fluid within the leveler unit is maintained at relatively constant volume thereby to maintain the desired height relationship.

During the level phase of operation, the piston 92 has the opposite ends thereof in direct engagement with the tray of an adjacent one of the valve assemblies. Because of this, movement of the piston 92 is damped in either direction from its centered position in bore 80. For example as viewed in FIG. 2, when the rod 66 is moving inwardly of the housing 64, it carries the piston 92 along with the valve tray 188 into the counterbore 82. Since the chamber defined by the counterbore 82 is filled with a viscous fluid, movement is damped under the control of fluid flow from the counterbore 82 through the orifice 116 and through an annular opening about the slight conical point 184 on the thermally responsive rod 170. Oil flow through the passageway 196 is blocked by the flap valve 192. Oil flow from the chamber 82 passes into the cross-flow chamber 98 and is then directed through the passageway 158 into the chamber defined by the counterbore 78.

Movement of the rod 66 outwardly of the housing 64 moves the piston 92 from its centered position and the movement is damped by oil flow from the chamber 78 through the orifice 114 around an annular opening defined by the conical point 176 on the thermally compensated rod 168. The oil thence flows through the cross-flow chamber 98 and the passageway 196 into counterbore 82.

Another feature of the present invention is that the valve assemblies cooperate with the counterbores in the housing 64 to enable the piston 92 to have a quick return to its centered position. More particularly, when the piston 92 moves into either of the counterbores 78, 82, the tray of the valve assembly in the other one of the counterbores will eventually be picked up by a shoulder of the counterbore and the end of the piston 92 will move away from the flap valve assembly thereon. The screw adjusting opening 183, 194 in each of the trays will permit fluid to flow freely from the space between the end of the piston and the hung up tray back into the counterbore so that when the rod 66 reverses its direction of movement, the piston will be able to freely move without any damping back to its centered position.

A fill phase of operation occurs when the vehicle has an increased load placed on the chassis frame 12. At this point, the spring 18 will compress to cause the vehicle to move below its desired predetermined height relationship. At this point, the rod 66 moves against the damping action of the valving associated therewith to shift the piston 92 into the counterbore 82. At this point, the relief groove 108 will be moved in the bore 80 to align with the ball follower element 314. It is shifted axially within the bypass check valve bore 240 into groove 108. This causes the check valve 248 to be maintained closed by the spring 246. Concurrently, high pressure fluid from the source 204 is directed to the supply conduit 202 and the inlet adapter 200 from whence it is directed to the high pressure passageway 220 to act against the leveling check valve ball 230. This valve lifts off the check valve seat and high pressure fluid will be directed through the leveler unit outlet opening and thence to the conduit 34 into the variable volume chamber of the leveler 28. The volume of fluid therein will increase to cause the leveler positions 26, 30 to extend apart against the upper part of the spring 18 thereby to raise the rear chassis frame 12 back to a desired height relationship with respect to the rear axle housing 14.

During the fill phase of operation, the check valve tray member 130 is hung up on the shoulder of counterbore 78 in spaced relationship to the end of the piston 92. Hence, when the vehicle is leveled, the piston 92 will quickly move to its centered position since oil will flow freely through the passageway 158 in the piston end and the space formed between the piston end and the hung up tray member 130. By virtue of this, the system will not direct any more fluid than is necessary into the leveler 128 and thereby will prevent the frame 12 from overshooting to a point above the desired height relationship between it and the axle housing 14.

Yet another phase of operation, exhaust, occurs when the vehicle is unloaded. The spring 18 will extend when the load is removed and will thereby hold the chassis frame 12 above its desired height relationship with the axle housing 14. When this occurs, the rod 66 moves outwardly of the housing 64 to shift the piston 92 in the bore 80 whereby the unloading valve is moved from the relief groove 110 to the outer periphery of the piston 92 at the end thereof located within the circumferential opening 286 of the housing 64. At this point, the bypass check ball is supported on the land portion 112 to open the bypass check valve and the unloading valve ball 210 is raised to the outer periphery of piston 92 in the vicinity of the passageway 286.

Thus, the bypass check valve 238 is opened and the unloading valve 200 is also opened. When this occurs, oil from the leveler unit 28 will exhaust through the upwardly inclined passageway 264 shown in FIG. 4, across the open bypass check ball 248 thence through the bore 240 and the passageway 266 and across the low pressure check valve assembly 268 and to the low pressure passageway 280. Concurrently, oil from the high pressure source 204 will follow the path of least resistance which is through the open unloading valve 200 and to the passageway 286 thence to the unloading passageway 284 and the low pressure port 258 back to the low side of the system. The unloading phase of operation will reduce the volume of oil within the leveler 28 and thereby cause the leveler portions 30, 26 to retract together to lower the sprung mass represented by the frame 12 toward the axle housing 14. When the desired height relationship returns the bypass check valve will remain open since the follower ball will be located on the ramp leading to the land 112. The ball 210 of the unloading valve will be returned to the relief groove 110 and oil will flow through the previously described bypass passageway. This is the previously described level or centered phase of operation.

Still another phase of operation occurs when the vehicle is overloaded to a point where the leveler unit 28 is no longer able to compensate for additional load. This occurs when the coils of the spring 18 are fully compressed. At this point, fluid from the high pressure source 204 will increase the pressure within the system to a point where it is desirable to relieve back to the sump. During this phase of operation, the relief occurs from the high pressure passageway 220 thence through the relief valve passageway 224 and across the orifice opening 312 in the damper valve element 302 which is shifted within the insert 310 so that the ball relief valve 304 will lift from the inclined seat 306. The relieved flow then passes through the unloading passageway 284 and the outlet 258 back to the low side of the system.

While the embodiment of the present invention as herein disclosed constitutes a preferred form, it is to be understood that other forms may be adopted.

What is claimed is as follows:

1. A height control valve for regulating the flow of fluid between a high pressure source and a low pressure source to and from a leveler unit for maintaining a predetermined height relationship between first and second portions of a vehicle comprising: a valve body having a bore therethrough, a valve piston within said bore including opposite ends thereon each of which has a relief passageway therethrough, a control orifice in each of said piston ends, means including an elongated rod of thermally responsive material having one end thereof connected to one of said piston ends and the opposite end located in close proximity to one of said orifices for restricting flow of damping fluid between opposite ends of said piston, means forming a counterbore at each opposite end of said main piston, a valve tray in each of said counterbores, a flapper valve on each of said valve trays for controlling fluid flow through the relief opening at each end of said piston, said valve tray being movable separately from said piston and separable therefrom when one end of the piston moves outwardly of an adjacent counterbore to allow free flow of oil from the counterbore into a variable volume space between the end of the piston and the valve tray to permit quick return of the piston to a centered position, first and second valve means in said housing, coacting means between said piston and one of said first valve means for communicating the high pressure source with a leveler unit during a fill phase of operation, second coacting means between said main piston and said second valve means for directing fluid from the leveler unit to a low pressure source during an exhaust phase of operation.

2. In a fluid flow control valve for controlling fluid flow between a high pressure source and a low pressure source in fluid connection with a vehicle leveler unit having means including a pressurizable variable volume fluid chamber therein selectively filled with fluid to maintain a predetermined height relationship between first and second portions an improved valve damper comprising: a valve housing portion adapted to be connected to one of the vehicle portions, a valve operator adapted to be connected to the other of the vehicle portions, a bore formed in said housing, a piston within said bore slidably supported by said housing for reciprocation therein, said valve operator being connected to said piston for reciprocating it within said bore in response to relative movement between the first and second portions of the vehicle, a flow chamber within said main piston, said flow chamber being communicated with opposite ends of said piston through an orifice opening in each end of said piston, a pair of elongated temperature responsive elements located within said flow chamber, each of said elements having one end thereof fixedly secured to one end of said main piston and the opposite end thereof located in close proximity to said orifice opening for changing the flow area therethrough in accordance with the temperature of oil filling said valve thereby to maintain a controlled damping of movement of the piston within the piston bore, valve means in said valve housing for controlling flow between the low pressure source, high pressure source and leveler unit, and coacting means between said piston and valve means for positioning said valve means in different control phases only following damping by said piston whereby normal road movements of said vehicle will not operate said valve means.

3. A fluid flow control valve for controlling fluid flow between a high pressure source and a low pressure source in fluid connection with a vehicle leveler unit having means including a pressurizable variable volume fluid chamber therein selectively filled with fluid to maintain a predetermined height relationship between first and second portions of the vehicle comprising: a valve housing adapted to be connected to one of the vehicle portions, a valve operator adapted to be connected to the other of the vehicle portions, a valve bore formed in said housing, a piston slidably supported within said bore, said valve operator being connected to said main piston for reciprocating it within said bore in response to relative movement between the first and second portions of the vehicle, a flow chamber within said main piston, said flow chamber being communicated with opposite ends of said piston through an orifice opening in each end of said piston, a pair of elongated temperature responsive elements located within said flow chamber, each of said elements having one end thereof fixedly secured to one end of said main piston and the opposite end thereof located in close proximity to said orifice opening for changing the flow area therethrough in accordance with the temperature of oil filling said valve thereby to maintain a controlled damping of movement of the piston within the piston bore, first passageway means on one side of said bore adapted to be connected to a high pressure source of fluid, second passageway means on the other side of said bore adapted to be connected to a low pressure source, means forming an annular opening around said piston between said first and second passageways, unloading valve means within said first passageway for blocking communication between said first and second passageways, coacting means on said piston and unloading valve means to open communication between said passageway means to communicate the high and low pressure sources during an exhaust phase of operation, second valve means for directing fluid from said first passageway means to a leveler unit during a fill phase of operation, coacting means on said piston and second valve means to initiate a fill phase of operation when a vehicle is loaded.

4. A flow control valve for regulating flow of fluid between a high pressure source and a low pressure source of an automatic vehicle leveling system and a leveler unit therein connected between a first sprung vehicle portion and a second unsprung vehicle portion comprising: a valve housing adapted to be connected to one of the vehicle portions having a main piston bore, a piston slidably supported in said housing bore, a lever adapted to be connected to the other of the vehicle portions for slidably reciprocating said main piston within the housing, means forming a counterbore in said housing at opposite ends of said piston, a valve tray slidably supported within each of said counterbores, a piston check valve element secured to said tray and movable therewith, an opening through said tray, a portion of said piston check valve overlying said opening and being maintained thereagainst to prevent oil flow therethrough upon movement of said main piston in a direction into the counterbore, an orifice passageway in each end of said piston, a relief opening in each end of said piston, a pair of elongated control rods each having one end fixed to one end of said piston and having the opposite end thereof located in close, coaxial proximity to the orifice passageway in the opposite end of said piston to control flow through the orifice passageway in accordance with the temperature of oil filling the piston bore and restricting flow of fluid from one of the counterbores through the piston and a relief opening in the opposite end thereof for flow into the opposite counterbore to produce a damping of piston movement on opposite reciprocation of the piston within said piston bore, each of said counterbores including means therein for supporting each of said valve trays in spaced relationship to an adjacent end of said piston as it moves outwardly of a given counterbore to allow free oil flow between the counterbore and the end of the piston moving outwardly thereof whereby the piston is quickly returned to a centered position following vehicle leveling to prevent overshoot of the vehicle portions above and below a desired height relationship, a valve inlet adapted to be connected to the high pressure source and a valve outlet adapted to be connected to a low pressure source, bypass valve means, means including a bypass valve plunger for maintaining said bypass valve means normally open when the valve piston is in a centered position to bypass oil from the valve inlet to the valve outlet, a leveling passageway in said valve adapted to be connected to a leveler unit, said passageway communicating with said bypass valve, said plunger operated by said piston to close said bypass valve when the piston is moved inwardly of the piston bore when the vehicle is loaded to close communication through the bypass means and to cause high pressure fluid to flow through said leveling passageway into the leveler unit during a fill-phase of operation, unloading means including an unloading valve operative to communicate the valve inlet to said valve housing and the valve outlet, and means including a second relief groove on the outer periphery of said main piston and means on said unloading valve to position it to allow flow of high pressure fluid from the valve inlet to said unloading valve and to said valve outlet during an unloading phase of operation.

* * * * *